(12) United States Patent
Schmidt et al.

(10) Patent No.: US 11,280,942 B2
(45) Date of Patent: Mar. 22, 2022

(54) EXPOSED-LENS RETROREFLECTIVE ARTICLE COMPRISING COLOR LAYERS COMPRISING BI-LAYER STRUCTURES

(71) Applicant: 3M INNOVATIVE PROPERTIES COMPANY, St. Paul, MN (US)

(72) Inventors: Daniel J. Schmidt, Woodbury, MN (US); Matthew S. Stay, Minneapolis, MN (US); Michael A. McCoy, St. Paul, MN (US); Kui Chen-Ho, Woodbury, MN (US); Richard S. Buckanin, Rochester, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 15/733,030

(22) PCT Filed: Oct. 25, 2018

(86) PCT No.: PCT/US2018/057544
§ 371 (c)(1),
(2) Date: Apr. 24, 2020

(87) PCT Pub. No.: WO2019/084287
PCT Pub. Date: May 2, 2019

(65) Prior Publication Data
US 2020/0264348 A1    Aug. 20, 2020

Related U.S. Application Data

(60) Provisional application No. 62/675,010, filed on May 22, 2018, provisional application No. 62/578,343, filed on Oct. 27, 2017.

(51) Int. Cl.
*G02B 5/128* (2006.01)
*A41D 13/01* (2006.01)

(52) U.S. Cl.
CPC ............. *G02B 5/128* (2013.01); *A41D 13/01* (2013.01)

(58) Field of Classification Search
None
See application file for complete search history.

(56) References Cited

U.S. PATENT DOCUMENTS 3,700,305 A    10/1972    Bingham
4,763,985 A    8/1988    Bingham
(Continued)

FOREIGN PATENT DOCUMENTS

WO    WO 1994/25666    11/1994
WO    WO 2016-039820    3/2016
(Continued)

OTHER PUBLICATIONS

Decher, "Fuzzy Nanoassemblies: Toward Layered Polymeric Multicomposites", Science, Aug. 1997, vol. 277, No. 5330, pp. 1232-1237.

(Continued)

*Primary Examiner* — Jennifer D. Carruth
(74) *Attorney, Agent, or Firm* — Kenneth B. Wood (57) ABSTRACT

An exposed-lens retroreflective article including a binder layer and a plurality of retroreflective elements. Each retroreflective element includes a transparent microsphere partially embedded in the binder layer. At least some of the retroreflective elements comprise at least one color layer comprising a bi-layer structure.

21 Claims, 5 Drawing Sheets

(56) References Cited

U.S. PATENT DOCUMENTS

| | | |
|---|---|---|
| 5,344,705 A | 9/1994 | Olsen |
| 5,866,236 A | 2/1999 | Faykish |
| 6,172,810 B1 * | 1/2001 | Fleming ................. G02B 5/128 |
| | | 359/529 |
| 6,361,850 B1 | 3/2002 | Billingsley |
| 7,651,557 B2 | 1/2010 | Burns |
| 8,234,998 B2 | 8/2012 | Krogman |
| 8,470,394 B2 | 6/2013 | Koppes |
| 9,248,470 B2 | 2/2016 | Koppes |
| 2001/0030811 A1 | 10/2001 | Kasai |
| 2005/0162742 A1 | 7/2005 | Fleming |
| 2012/0019607 A1 | 1/2012 | Dunn |
| 2013/0273242 A1 | 10/2013 | Krogman |
| 2016/0170104 A1 | 6/2016 | Nand |
| 2017/0131444 A1 | 5/2017 | Xia |
| 2017/0192142 A1 | 7/2017 | Niwas |
| 2017/0276844 A1 | 9/2017 | McCoy |
| 2017/0293056 A1 | 10/2017 | Chen-Ho |

FOREIGN PATENT DOCUMENTS

| | | |
|---|---|---|
| WO | WO 2016-053734 | 4/2016 |
| WO | WO 2018-151759 | 8/2018 |
| WO | WO 2019-084297 | 5/2019 |
| WO | WO 2019-084302 | 5/2019 |

OTHER PUBLICATIONS

Iler, "Multilayers of colloidal particles", Journal of Colloid and Interface Science, 1966, vol. 21, No. 6, pp. 569-594.

Krogman, "Automated Process for Improved Uniformity and Versatility of Layer-by-Layer Deposition", Langmuir, 2007, vol. 23, No. 6, pp. 3137-3141.

Seyrek, "Layer-by-Layer Assembly of Multifunctional Hybrid Materials and Nanoscale Devices", Polymer Science: A Comprehensive Reference, 2012. vol. 7 pp. 159-185.

International Search Report for PCT International Application No. PCT/US2018/057544, dated Feb. 15, 2019, 3 pages.

* cited by examiner

EXPOSED-LENS RETROREFLECTIVE ARTICLE COMPRISING COLOR LAYERS COMPRISING BI-LAYER STRUCTURES

CROSS REFERENCE TO RELATED APPLICATIONS

This application is a national stage filing under 35 U.S.C. 371 of PCT/US2018/057544, filed Oct. 25, 2018, which claims the benefit of provisional Application No. 62/675,010, filed May 22, 2018, and provisional Application No. 62/578,343, filed Oct. 27, 2017, the disclosure of which is incorporated by reference in its/their entirety herein.

BACKGROUND

Retroreflective materials have been developed for a variety of applications. Such materials are often used e.g. as high visibility trim materials in clothing to increase the visibility of the wearer. For example, such materials are often added to garments that are worn by firefighters, rescue personnel, road workers, and the like.

SUMMARY

In broad summary, herein is disclosed an exposed-lens retroreflective article including a binder layer and a plurality of retroreflective elements. Each retroreflective element includes a transparent microsphere partially embedded in the binder layer. At least some of the retroreflective elements comprise at least one color layer comprising a bi-layer structure. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Figure 1:
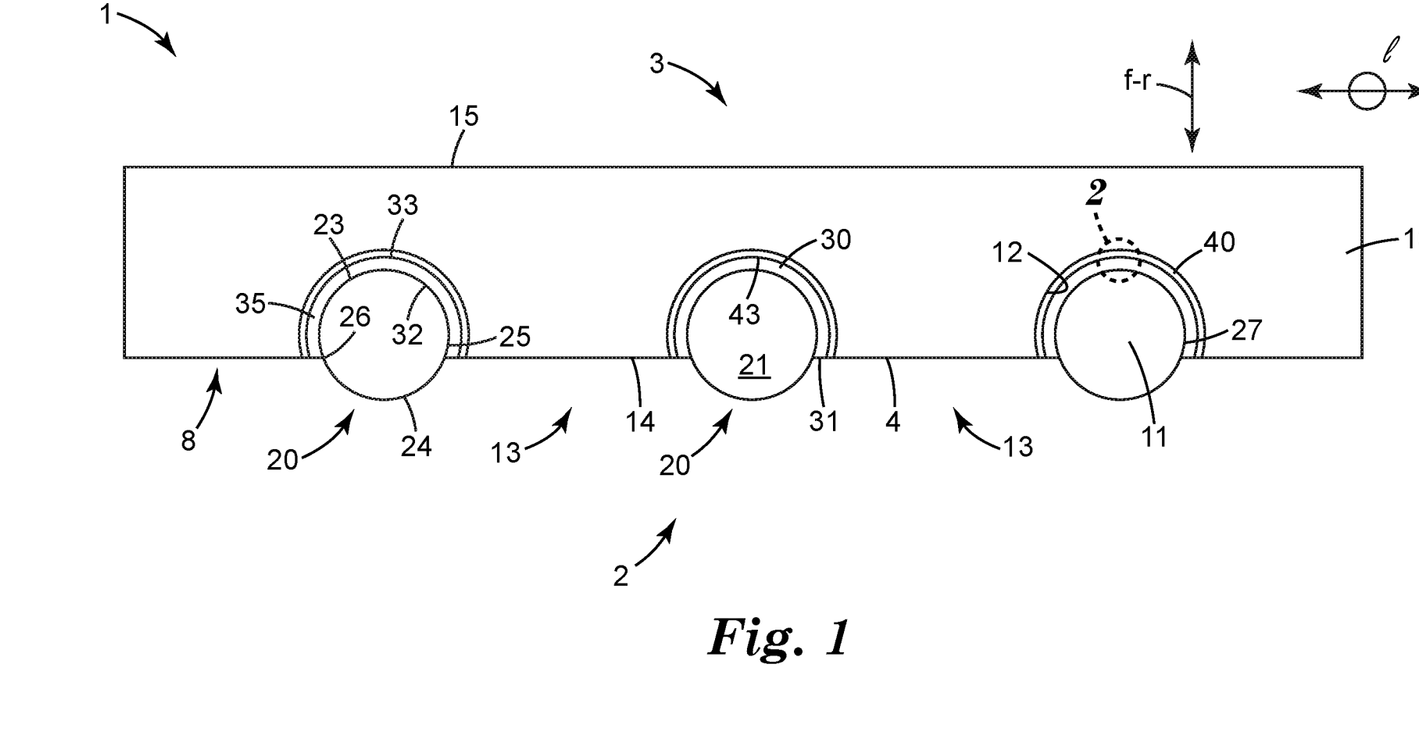
FIG. 1 is a side schematic cross sectional view of an exemplary exposed-lens retroreflective article.

As used herein, terms such as "front", "forward", and the like, refer to the side from which a retroreflective article is to be viewed. Terms such as "rear", "rearward", and the like, refer to an opposing side, e.g. a side that is to be coupled to a garment. The term "lateral" refers to any direction that is perpendicular to the front-rear direction of the article, and includes directions along both the length and the breadth of the article. The front-rear direction (f-r), and exemplary lateral directions (l) of an exemplary article are indicated in FIG. 1.

Terms such as disposed, on, upon, atop, between, behind, and the like, do not require that a first entity (e.g. a layer) must necessarily be in direct contact with a second entity (e.g. a second layer) that the first entity is e.g. disposed on or behind. Rather, such terminology is used for convenience of description and allows for the presence of an additional entity (e.g. layer) or entities therebetween, as will be clear from the discussions herein.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

FIG. 1 illustrates an exposed-lens retroreflective article 1 in exemplary embodiment. As shown in FIG. 1, article 1 comprises a binder layer 10 that comprises a plurality of retroreflective elements 20 spaced over the length and breadth of a front side of binder layer 10. Each retroreflective element comprises a transparent microsphere 21 that is partially embedded in binder layer 10 so that the microspheres 21 are partially exposed and define a front (viewing) side 2 of the article. The transparent microspheres thus each have an embedded area 25 that is seated in a receiving cavity 11 of binder layer 10, and an exposed area 24 that is exposed forwardly of binder layer 10, hence the designation of article 1 as an exposed-lens article. In at least some embodiments, the exposed areas 24 of microspheres 21 (or a color layer present thereon, as discussed later herein) are exposed to an ambient atmosphere (e.g., air) in the final article as-used, rather than being e.g. covered with any kind of transparent protective layer. In many embodiments, the microspheres are partially embedded in the binder layer so that on average, from 15, 20 or 30 percent of the diameter of the microspheres, to about 80, 70, 60 or 50 percent of the diameter of the microspheres, is embedded within binder layer 10.

A retroreflective element 20 will comprise a reflective layer 40 disposed between the transparent microsphere 21 of the retroreflective element, and the binder layer 10. The microspheres 21 and the reflective layers 40 collectively return a substantial quantity of incident light towards the light source. That is, light that strikes the retroreflective article's front side 2 passes into and through the microspheres 21 and is reflected by the reflective layer 40 to again reenter the microspheres 21 such that the light is steered to return toward the light source.

As illustrated in exemplary embodiment in FIG. 1, at least some of the retroreflective elements 20 will comprise at least one color layer 30. The term "color layer" is used herein to signify a layer that preferentially allows passage of electromagnetic radiation in at least one wavelength range while preferentially minimizing passage of electromagnetic radiation in at least one other wavelength range. In some embodiments the color layer will selectively allow passage of visible light of one wavelength range while reducing or minimizing passage of visible light of another wavelength range.

A color layer as disclosed herein does not function by index of refraction mismatching, whether between the color layer and a transparent microsphere on which the color layer is disposed, or between individual sublayers of the color layer. Rather, a color layer as disclosed herein by definition will perform wavelength-selective absorption of electromagnetic radiation by the use of a colorant (e.g. a dye or pigment) that is disposed in the color layer, as discussed in detail below. Any such color layer can be arranged so that the light that is retroflected by a retroreflective element passes through at least one color layer so that the retroreflected light exhibits a color imparted by the color layer.

At least some of the color layers 30 comprise a bi-layer structure comprising a first layer comprising a first material and a second layer comprising a second material. The first and second layers are in stacked relation with a major surface of the first layer being in intimate contact with a major surface of the second layer. The first material and the second material are disposed on (at least a portion of) a transparent microsphere by a layer-by-layer (LbL) self-assembly process as discussed in detail later herein.

Figure 2:
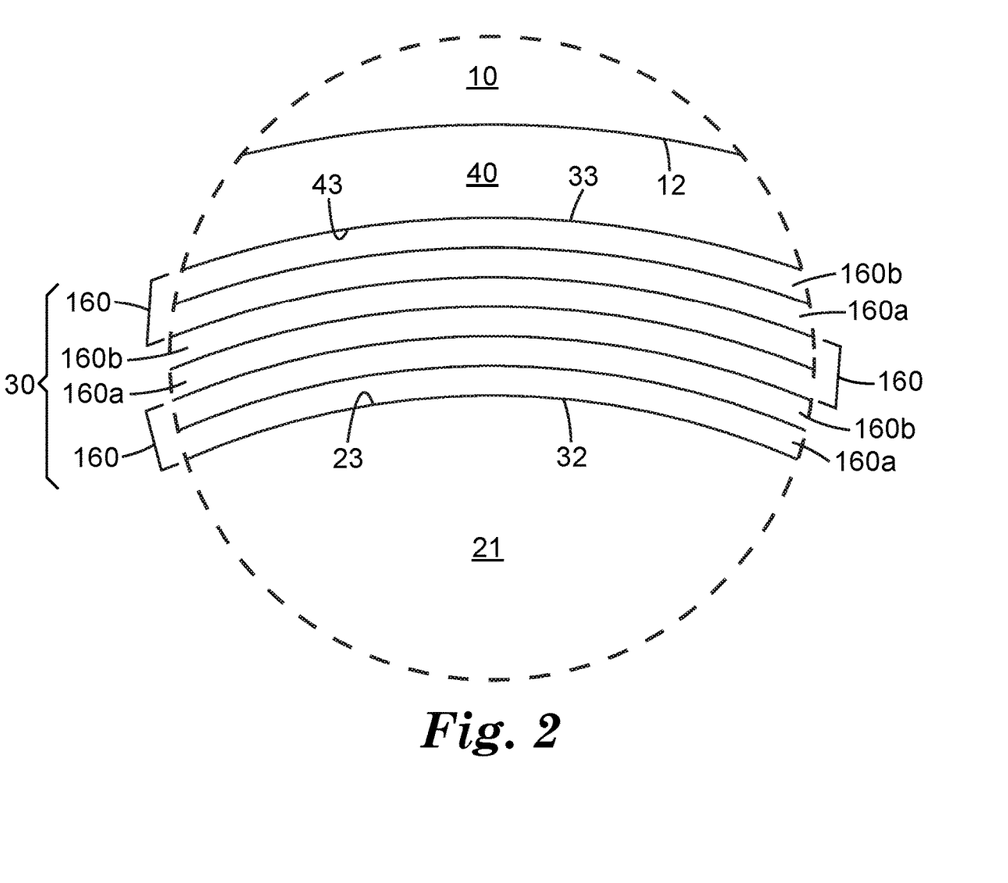
FIG. 2 is a side schematic cross sectional view of a portion of an exemplary localized color layer comprising a bi-layer structure.

In order to illustrate the use of bi-layers to form a color layer, FIG. 2 is a schematic magnified view of a portion of a transparent microsphere of the retroreflective article of FIG. 1. The color layer 30 follows the contour of the radially-outward surface of transparent microsphere 21 and, in this embodiment, includes a stack of three bi-layers 160. Each bi-layer 160 includes a first layer 160a and a second layer 160b. In some embodiments, the first layer 160a comprises a first material having a first binding group (e.g., a polycation) and the second layer 160b comprises a second material having a second binding group (e.g., a polyanion). While the color layer 30 shown in FIG. 1 depicts three bi-layers 160 for simplicity, it is within the scope of the present application to provide color layers having a plurality of bi-layers. In various embodiments, a color layer 30 as disclosed herein can include 1, 5, 10, 15, 20, or up to 100 bi-layers.

In order for the layers to bind together, the first material comprises a first binding group and the second material comprises a second binding group, and the first binding group and the second binding group have complementary interactions. The complementary interactions are usually complementary electrostatic interactions or complementary hydrogen bonding interactions between hydrogen bond donors and hydrogen bond acceptors. Polymers, nanoparticles, and small molecules can be referred to as "polyionic" or "polyion" or, specifically, "polyanionic", "polyanion", "polycation" or "polycationic," if they contain a plurality of negative or positive ionic charged sites, respectively. Examples of polyelectrolytes and charged nanoparticles are described in greater detail below.

In some embodiments, at least one of the first material or the second material comprises a polyelectrolyte. For instance, in certain embodiments the first material comprises a polyelectrolyte and the second material comprises charged nanoparticles. In some embodiments, the first material comprises a polyanion and the second material comprises a polycation, whereas in other embodiments the first material comprises a polycation and the second material comprises a polyanion. In some embodiments, the polyelectrolyte is a polycation.

In some embodiments, the polycation is a polycationic polymer. Suitable polycationic polymers can include, but are not limited to, polydiallyldimethylammonium chloride (PDAC), linear and branched poly(ethylenimine) (PEI), poly(allylamine hydrochloride) (PAH), polyvinylamine, chitosan, polyaniline, polyamidoamine, poly(vinylbenzyltrimethylamine), and members of the polyquaternium group. In some embodiments, the polyelectrolyte is a polyanionic polymer. Suitable polyanionic polymers include, but are not limited to, sulfonated polystyrene (PSS), poly(vinyl sulfate), poly(vinyl sulfonate), poly(acrylic acid), poly(methacrylic acid), dextran sulfate, heparin, hyaluronic acid, carrageenan, carboxymethylcellulose (CMC), alginate, sulfonated tetrafluoroethylene based fluoropolymers such as NAFION, poly(vinylphosphoric acid), poly(vinylphosphonic acid), and sodium hexametaphosphate. In some embodiments, the polycation is selected from the group consisting of polydiallyldimethylammonium chloride, polyethylenimine, polyallylamine, poly(2-(trimethylamino)ethyl methacrylate, and copolymers thereof.

At least one of the first material or the second material comprises at least one colorant that is a wavelength-selective light-absorbing (e.g. visible light-absorbing) material. In at least some embodiments, the colorant itself may bear the at least one binding group (e.g. as opposed to the colorant being mixed with some other material, e.g. a polyelectrolyte, that bears the binding group). For instance, one of the first material or the second material may comprise a) a pigment comprising at least one binding group; b) a dye comprising at least one binding group; or c) combinations of a) and b). In various embodiments, such a binding group may be e.g. a functional group selected from sulfonate, carboxylate, phosphonate, amine, ammonium, sulfonium, phosphonium, or combinations thereof. Such a functional group may be covalently bonded to the colorant. In other words, in some embodiments a colorant may be functionalized with charged moieties so that the colorant itself can function as a layer of a bi-layer, rather than, for example, the colorant needing to be mixed with a polyelectrolyte in order to form a layer of a bi-layer. (However, even a charged colorant may be mixed with a polyelectrolyte if desired.)

The term colorant broadly encompasses pigments and dyes. Conventionally, a pigment is considered to be a colorant that is generally insoluble in the material in which the colorant is present and a dye is considered to be a colorant that is generally soluble in the material in which the colorant is present, however, there may not always be a bright-line distinction as to whether a colorant behaves as a pigment or a dye when dispersed into a particular material.

The term colorant thus embraces any such material regardless of whether, in a particular environment, it is considered to be a dye or a pigment. Any number of one or more pigments and dyes may be combined to provide a particular color in the article.

In some embodiments, suitable dyes include for instance and without limitation, Chlorophenol Red, Acid Orange 12, Acid Blue 25, Eriochrome Black T, Lissamine Green B, Acid Fuchsin, Alizarin Blue Black B, Acid Blue 80, Acid Blue 9, Brilliant Blue G, Water Soluble Nigrosin, Methylene Blue, Crystal Violet, Safranin, Basic Fuchsin, and combinations thereof. Either a single dye or a mixture of two or more dyes can be used to achieve a desired color. One method of incorporating the dye into the conformal wavelength-selective radiation absorbing coating layer is to soak the coating layer in a dilute aqueous solution of the dye(s), rinse, and dry. In this method, the dye(s) ion exchange into the coating. In other embodiments, one or more dyes may be incorporated directly in a solution of the first material, a solution of the second material, or in both.

In some embodiments, suitable pigments include ionically surface-modified pigment nanoparticles commercially available as inkjet pigment colorants under the trade designation CAB-O-JET from Cabot Corporation (Boston, Mass.), such as cyan, magenta, and/or yellow pigments. In general, pigments or other wavelength-selective absorbing particles may be functionalized either by being covalently surface modified (e.g. to comprise negatively charged groups that are covalently bonded thereto) or non-covalently surface modified, for example, with an ionic surfactant. In particular embodiments a nanoparticulate pigment may be a sulfonate-functionalized pigment.

Suitable nanoparticulate pigments (e.g. with negatively charged binding groups covalently bonded thereto) can have an average primary or agglomerate particle size diameter of between 5 nanometers (nm) and 300 nm. The average particle size of the nanoparticles can be measured using transmission electron microscopy or scanning electron microscopy, for example. "Agglomerate" refers to a weak association between primary particles which may be held together by charge or polarity and can be broken down into smaller entities. "Primary particle size" refers to the mean diameter of a single (non-aggregate, non-agglomerate) particle. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e., at least 50%) are present as discrete unagglomerated nanoparticles in the coating suspensions. For example, in some embodiments, at least 70%, 80% or 90% of the nanoparticles can be present as discrete unagglomerated nanoparticles.

In some embodiments the nanoparticulate pigments can have a relatively small average particle size. For example, in some embodiments, the average primary or agglomerate particle size can be 5 nm or greater, 10 nm or greater, 15 nm or greater, 25 nm or greater, 40 nm or greater, 50 nm or greater, or 75 nm or greater; and 300 nm or smaller, 250 nm or smaller, 200 nm or smaller, 150 nm or smaller, or 100 nm or smaller.

The concentration of nanoparticles can be at least 30 wt. % of the (dried) color layer. In some embodiments, the concentration of nanoparticles can be no greater than 80 wt. %, no greater than 85 wt. %, no greater than 90 wt. %, or no greater than 95 wt. %. The concentration of nanoparticles can be determined by methods known in the art, such as thermogravimetric analysis. In some embodiments, the dried color layer can include 30 wt. % or more nanoparticles, 40 wt. % or more, 50 wt. % or more, 55 wt. % or more, 60 wt. % or more, 65 wt. % or more, or 70 wt. % or more, to impart a desired color to the retroreflective article.

In many embodiments, the (dried) color layer has a thickness of 10 nanometers (nm) or greater, 15 nm or greater, 20 nm or greater, 25 nm or greater, 30 nm or greater, 35 nm or greater, 40 nm or greater, 45 nm or greater, or 50 nm or greater; and 2 micrometers or less, 1.5 micrometers or less, 1 micrometer or less, 900 nm or less, 750 nm or less, 600 nm or less, 500 nm or less, 400 nm or less, 350 nm or less, 300 nm or less, 250 nm or less, 200 nm or less, 150 nm or less, 100 nm or less, or 75 nm or less. Stated another way, the dried color layer may have a thickness between 10 nm and 400 nm, between 10 nm and 200 nm, or between 50 nm and 150 nm.

As illustrated in exemplary embodiment in FIG. 1, in some embodiments a color layer 30 as disclosed herein will be a localized color layer. By definition, a localized color layer 30 is a discontinuous color layer at least a portion of which is an embedded portion 35, meaning that the portion is disposed between an embedded area 25 of a transparent microsphere 21 and binder layer 10, as shown in exemplary embodiment in FIG. 1. A localized color layer will generally conform to at least an embedded area 25 of the transparent microsphere on which it is disposed. By definition, a localized color layer does not comprise any portion that extends away from a microsphere 21 along any lateral dimension of article 1 to any significant extent. In particular, such a localized color layer 30 does not extend laterally so as to bridge a lateral gap between neighboring transparent microspheres 21.

In other embodiments, a color layer 30 may be a non-localized color layer. By this is meant a color layer that includes portions that are present on areas 13 of binder layer 10 between microspheres 21, rather than a color layer that is restricted to only being present in close proximity to a microsphere 21 in the manner described above. In some particular embodiments such a non-localized color layer may bridge lateral gaps between neighboring microspheres 21, e.g. the color layer may extend continuously along the length and breadth of at least selected areas of front side 2 of retroreflective article 1.

In some embodiments, the entirety of a localized color layer 30 may be embedded as described above (as in the exemplary design depicted in FIG. 1). However, an embedded portion 35 of a color layer 30 may not necessarily be completely surrounded by the combination of the binder layer 10 and the transparent microsphere 21. That is, in some embodiments the minor edges 31 of the color layer may be exposed (as depicted in exemplary embodiment in FIG. 1) rather than being "buried" between the transparent microsphere 21 and the binder material 10. That is, the locations 26 which mark the boundary between an exposed area 24 of a microsphere and an embedded area 25 of a microsphere, may be abutted by a portion of a color layer 30 rather than by a portion of binder layer 10.

In some embodiments, an embedded portion 35 of a color layer 30 (whether localized or not) may comprise a generally arcuate shape in which a major forward surface 32 of embedded portion 35 conforms to a major rearward surface 23 of microsphere 21. In some embodiments, major forward surface 32 of color layer portion 35 may be in direct contact with major rearward surface 23 of microsphere 21; however, in some embodiments major forward surface 32 of color layer 30 may be in contact with a layer (e.g. a transparent layer that serves a protective function, as a tie layer or adhesion-promoting layer, etc.) that is itself disposed on major rearward surface 23 of microsphere 21. A major rearward surface 33 of color layer 30 (e.g. a surface that is in contact with forward surface 43 of reflective layer 40) may be closely congruent with (e.g. locally parallel to) the major forward surface 32 of color layer 30.

Figure 3:
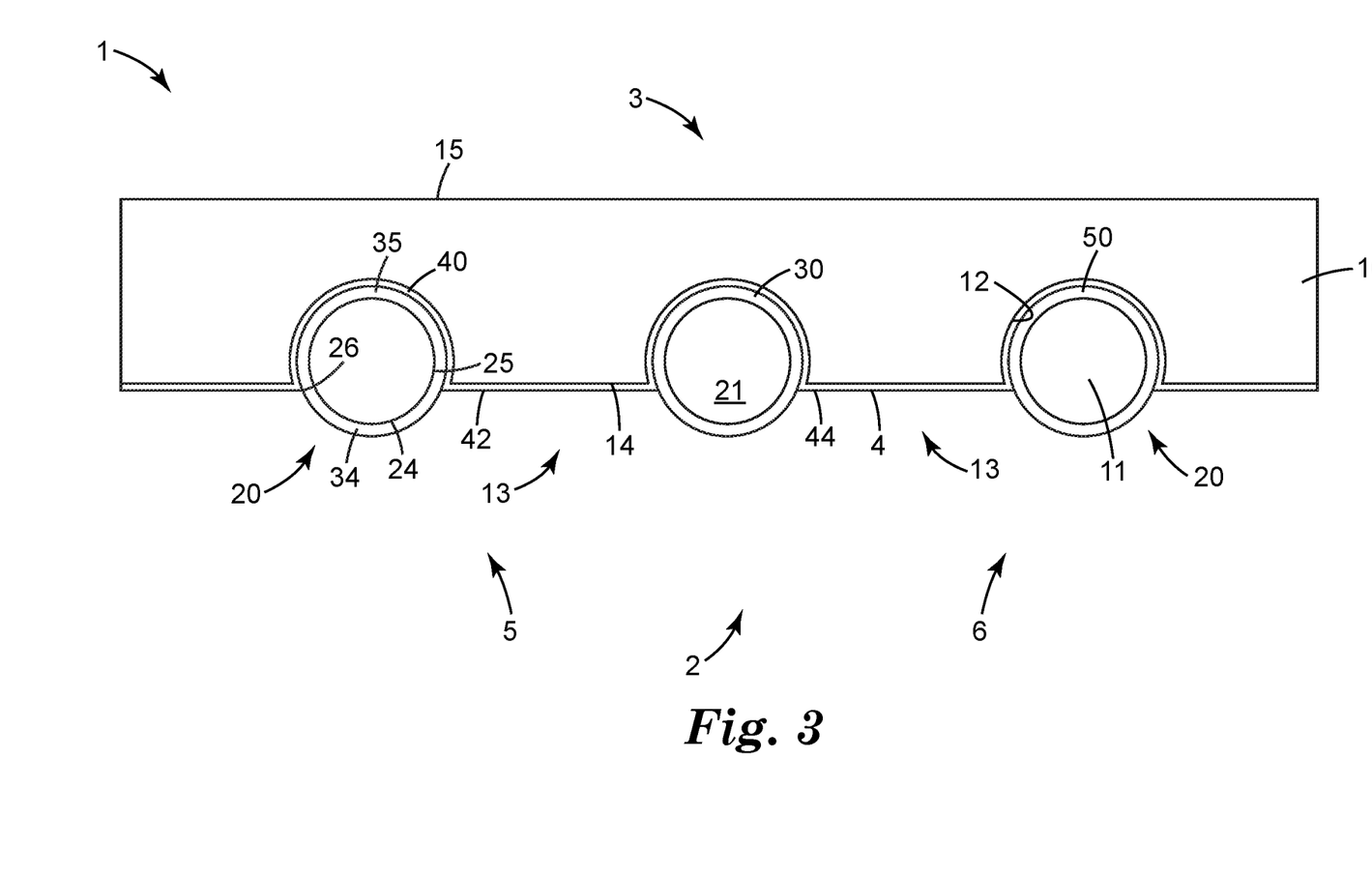
FIG. 3 is a side schematic cross sectional view of another exemplary exposed-lens retroreflective article.
Figure 4:
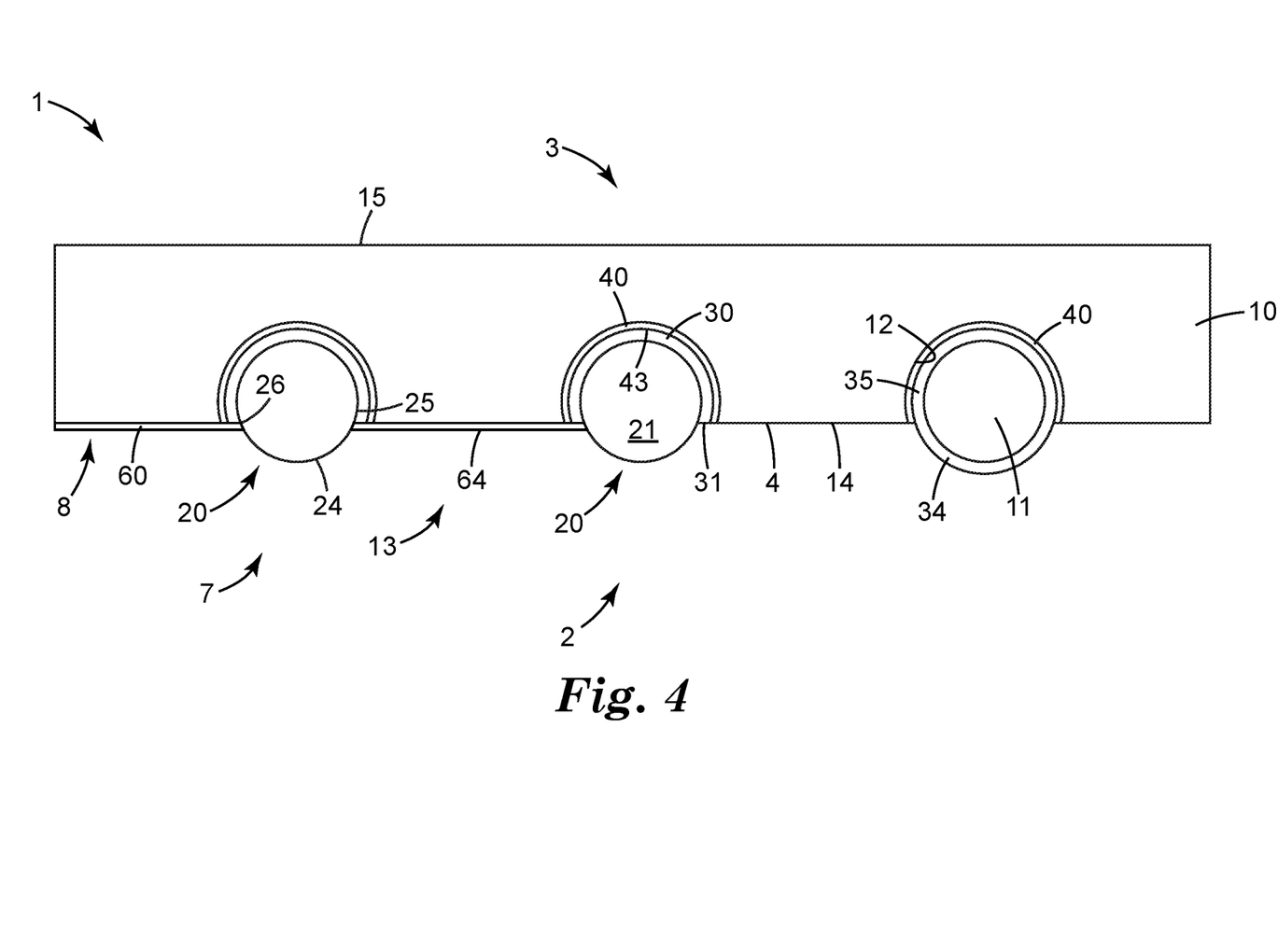
FIG. 4 is a side schematic cross sectional view of another exemplary exposed-lens retroreflective article.

In some embodiments, at least some localized color layers 30 may each be disposed around the entirety of a transparent microsphere 21, as shown in exemplary embodiment in FIG. 3 (and as shown for the rightmost color layer of FIG. 4). In such embodiments, an embedded portion 35 of the color layer 30 is disposed between the embedded area 25 of transparent microsphere 21 and binder layer 10, and an exposed portion 34 of the color layer 30 is disposed on an exposed area 24 of transparent microsphere 21. That is, in such embodiments at least some color layers 30 may each completely encapsulate a transparent microsphere 21 on which that color layer is disposed. It will be appreciated that in such arrangements, retroreflected light may pass through multiple areas of the color layer. Such arrangements thus may provide enhanced color to retroreflected light.

In some embodiments all of the retroreflective elements 20 that are provided with a color layer 30, are provided with color layers 30 of the same color. The article may thus provide retroreflected light of at least generally the same color in all retroreflective areas of the article. In other embodiments, one or more areas 5 of article 1 may comprise retroreflective elements that comprise color layers 30 of a first color, as shown in exemplary embodiment in FIG. 3. Also as shown in FIG. 3, one or more second areas 6 of article 1 may comprise retroreflective elements that comprise second color layers 50 of a second color that is different from the first color of first color layer 30. In various embodiments second color layers 50 may be LbL color layers, or may be any color layer of any suitable type and composition, e.g. deposited by any suitable process. Various color layers are disclosed in U.S. Provisional Patent Application No. 62/675,020, entitled EXPOSED-LENS RETROREFLECTIVE ARTICLE COMPRISING LOCALIZED COLOR LAYERS, filed evendate herewith and incorporated by reference in its entirety herein.

In general, by two colors being different from each other is meant that the colors exhibit an (x, y) chromaticity difference (i.e. a linear distance as calculated by the usual square-root method) of at least 0.01 in a CIE 1931 XYZ color space chromaticity diagram. (It will be appreciated that many colors may differ so markedly from each other that they can be established as being different from each other merely by casual inspection.) With specific regard to colors exhibited in retroreflected light, retroreflective elements will be considered to exhibit different colors if they a chromaticity difference of at least 0.01 in a CIE 1931 XYZ color space chromaticity diagram, when viewed in retroreflected light at an observation angle of 0.2 degrees and at an entrance angle of 5 degrees. In some embodiments, a first color layer of a first retroreflective element may exhibit a color that differs from that of a second color layer of a second retroreflective element, as manifested by a chromaticity difference of at least 0.02, 0.05, 0.10, 0.15, 0.20, 0.30, or 0.40, when viewed in retroreflected light at an observation angle of 0.2 degrees and at an entrance angle of 5 degrees.

Such arrangements may allow a retroreflective article 1 to comprise some areas that exhibit retroreflected light of a first color, and other areas that exhibit retroreflected light of a second, different color. Such arrangements may be provided irrespective of the color(s) that the article exhibits in ambient (non-retroreflective) light, and can be used in combination with any of the arrangements disclosed below by which the appearance of the article in ambient light may be manipulated.

Article 1 may be arranged to provide that the appearance of article 1 in ambient (non-retroreflected) light is controlled as desired. For example, in the exemplary arrangement of FIG. 1 (in which the reflective layers 40 are discontinuous) the front surface 4 of article 1 is provided in part (e.g. in areas 8 of front side 2 of article 1 that are not occupied by transparent microspheres 21) by a front surface 14 of binder layer 10. In such embodiments the appearance of front side 2 of article 1 in ambient light may thus be largely dominated by the color (or lack thereof) of binder layer 10 in areas 13 of binder layer 10 that are laterally between microspheres 21. In some such embodiments binder layer 10 may be a colorant-loaded (e.g. pigment-loaded) binder layer. The pigment may be chosen to impart any suitable color in ambient light, e.g. fluorescent yellow, green, orange, and so on.

In some arrangements e.g. as shown in FIG. 3, a reflective layer 40 may be a continuous, opaque reflective layer that includes portions 42 that are disposed on front surface 14 of binder layer 10 (e.g. so that front surface 44 of reflective layer portions 42 provides front surface 4 of article 1 in between-microsphere areas of article 1). Such an article may thus exhibit an appearance in ambient light that is largely dominated by portions 42 of reflective layer 40 (for example, a reflective layer such as e.g. a vapor-deposited metal layer may often exhibit a relatively neutral, e.g., gray, color in ambient light). In such a case, the color (or, in general, the appearance) of binder layer 10 may not affect the appearance of the article in ambient light, at least in areas of the article that comprise opaque reflective layer 42. In some such cases, binder layer 10 may be unpigmented. However, in some embodiments binder layer 10 may be pigmented e.g. to roughly match the appearance of reflective layer portions 42 in ambient light, e.g. to minimize any visual impact if reflective layer portion 42 is compromised or damaged.

In some arrangements, at least a portion of a front surface of article 1 in areas 8 laterally between the transparent microspheres 21, can be provided by an exposed surface 64 of an exposed, non-localized color layer 60 as shown in exemplary embodiment in FIG. 4. In some embodiments such a non-localized color layer may be a different color layer than that described above; that is, it may be present only on the major front surface of the binder and may not comprise embedded portions that are between microspheres and the binder. Such a color layer need not necessarily be a bi-layer (LbL) color layer and may be deposited by any suitable method (e.g. by coating of a pigmented coating mixture) and may exhibit a different color than the above-described LbL color layer. Such a non-localized color layer 60 may extend continuously over a selected area 7 of article 1, although it may be interrupted by the transparent microspheres 21. In such a case, the appearance in ambient light of at least a selected area 7 of front side 2 of article 1 may be governed at least in part by a non-localized color layer 60. Of course, as noted earlier herein, in some embodiments an LbL color layer 30 may be a non-localized color layer with portions that extend into areas laterally between microspheres, such that these portions affect the appearance of these areas in ambient light.

It is emphasized that any of the arrangements disclosed herein by which the appearance of article 1 in ambient light may be manipulated, may be used in combination with any of the arrangements disclosed herein by which the appearance of article 1 in retroreflected light may be manipulated. Such arrangements are not limited to the exemplary combinations shown in the Figures herein. Various possible arrangements as described in detail in U.S. Provisional Patent Application No. 62/675,020, entitled EXPOSED-LENS RETROREFLECTIVE ARTICLE COMPRISING LOCALIZED COLOR LAYERS, filed evendate herewith and incorporated by reference in its entirety herein.

As noted briefly above, a retroreflective element 20 will comprise a reflective layer 40 disposed between the transparent microsphere 21 and the binder layer 10. In many embodiments, the reflective layer 40 will be disposed at least between the embedded area 25 of microsphere 21 and the underlying surface 12 of binder layer 10. Reflective layer 40 will be disposed behind color layer 30 (e.g. between rearward surface 33 of color layer 30 and the underlying surface 12 of binder layer 10) so that the color layer 30 is in the retroreflective light path as mentioned above. In various embodiments, a reflective layer may comprise an average thickness of at least 10, 20, 40 or 80 nanometers; in further embodiments a reflective layer may comprise an average thickness of at most 10, 5, 2 or 1 microns, or of at most 400, 200 or 100 nanometers.

In some embodiments a reflective layer 40 may be a discontinuous reflective layer, e.g. a localized reflective layer that is located only in the region described above, as shown in exemplary embodiment in FIG. 1. In other embodiments a reflective layer 40 may be a non-localized reflective layer, e.g. a continuous reflective layer, that comprises portions that extend laterally beyond the localized region described above. For example, in some embodiments a reflective layer 40 may include portions 42 that extend laterally between microspheres 21. Such portions 42 may be provided over at least one or more macroscopic areas of the retroreflective article, as shown in exemplary embodiment in FIG. 3.

In some embodiments, a reflective layer may comprise a metal layer, e.g. a single layer of vapor-deposited metal (e.g. aluminum or silver). Such a deposition method may be particularly suited for providing a non-localized, e.g. continuous reflective layer, although the deposition may be e.g. masked in order to provide the reflective layer only in certain macroscopic areas of the article as desired. Moreover, in some embodiments, portions of a previously-deposited (e.g. a vapor-deposited) reflective layer may be removed, e.g. by etching, to transform a continuous reflective layer into a discontinuous reflective layer, as discussed in further detail later herein.

In some embodiments, a reflective layer may be a dielectric reflective layer, comprised of an optical stack of high and low refractive index layers that collectively provide reflective properties. Such a material may be suited for use e.g. as a continuous reflective layer or as a discontinuous reflective layer. Dielectric reflective layers are described in further detail in U.S. Patent Application Publication No. 2017/0131444, which is incorporated by reference herein in its entirety for this purpose.

In particular embodiments, a dielectric reflective layer may be a layer-by-layer (LbL) structure in which each layer of the optical stack (i.e., each high-index layer and each low-index layer) is itself comprised of a substack of multiple bi-layers. Each bi-layer is in turn comprised of a first sub-layer (e.g. a positively charged sub-layer) and a second sub-layer (e.g. a negatively charged sub-layer). At least one sub-layer of the bi-layers of the high-index substack will comprise ingredients that impart a high refractive index, while at least one sub-layer of the bi-layers of the low-index substack will comprise ingredients that impart a low refractive index. LbL structures, methods of making such structures, and retroreflective articles comprising dielectric reflective layers comprising such structures, are described in detail in U.S. Patent Application Publication No. 2017/0276844, which is incorporated by reference herein in its entirety. It will be understood that the herein-disclosed use of LbL assemblies comprising wavelength-selective colorants, for the purpose of performing selective absorption of visible light in order to manipulate the color of retroreflected light, will be distinguished from the use, e.g. as in the '844 Publication, of LbL structures comprising refractive-index-mismatched layers for the purpose of providing reflectivity.

In particular embodiments, a printed or coated reflective layer may comprise particles, e.g. flakes, of reflective material (e.g. aluminum flake powder, pearlescent pigment, etc.), e.g. as described in U.S. Pat. No. 5,344,705, which is incorporated by reference in its entirety herein. In some embodiments, binder layer 10 may be loaded with particles, e.g. flakes, of reflective material, so that a portion of binder layer that is rearwardly adjacent to transparent microsphere 21 and color layer 30 can provide a reflective layer 40 as disclosed herein. (In such a design, this portion of binder layer 10 will be considered to comprise a reflective layer that is disposed between the transparent microsphere 21 and the (rearward portion of) binder layer 10.) In some embodiments, a reflective layer (e.g. a localized embedded reflective layer) may be a "transferred" reflective layer, meaning a reflective layer that is separately made and is then physically transferred (e.g. laminated) to a carrier-borne transparent microsphere. Such "transferred" reflective layers are described in detail in U.S. Provisional Patent Application No. 62/578,343 (e.g., in Example 2.3 (including Examples 2.3.1-2.3.3) and Example 2.4 (including Examples 2.4.1-2.4.5), which is incorporated by reference in its entirety herein.

Figure 5:
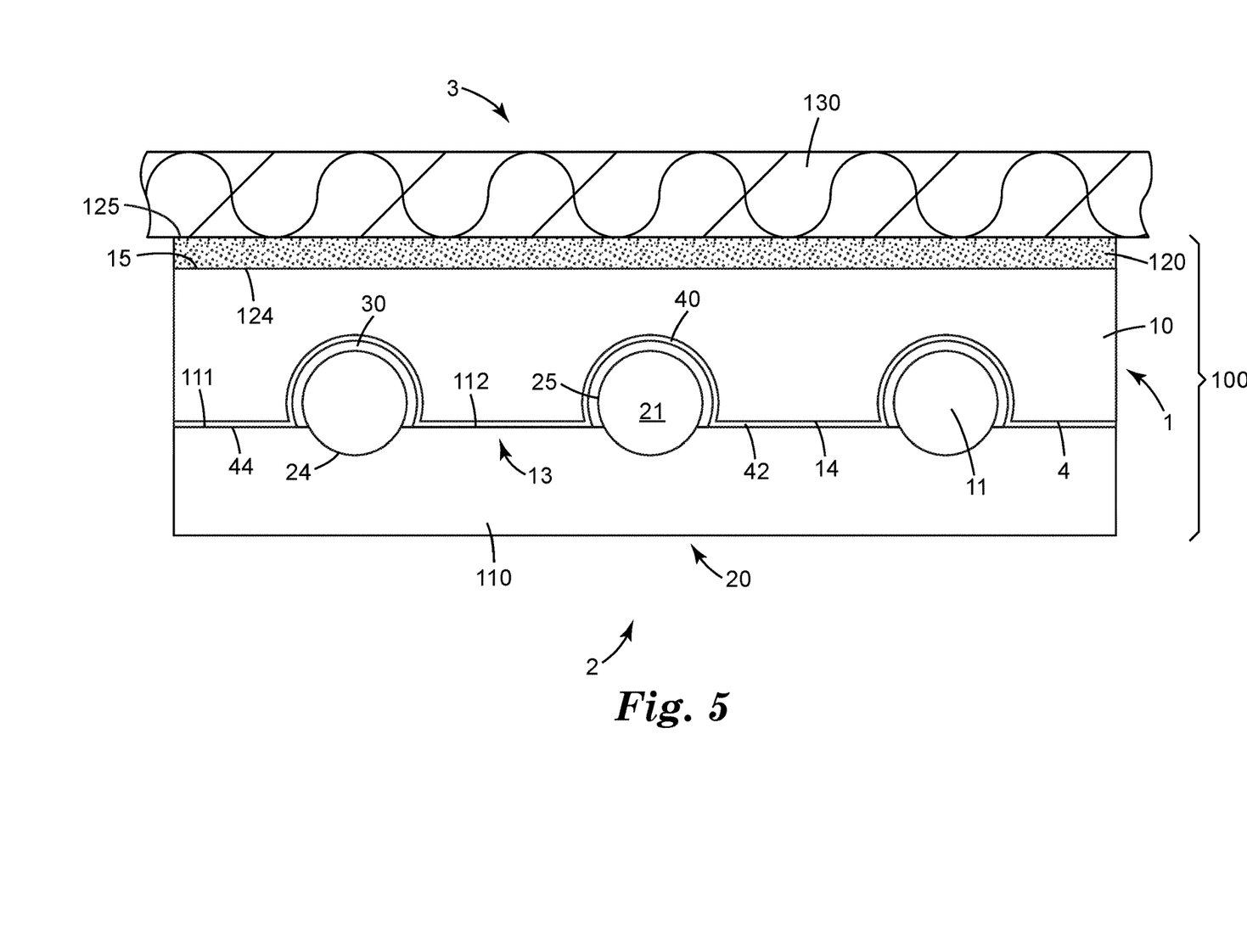
FIG. 5 is a side schematic cross sectional view of an exemplary transfer article comprising an exemplary exposed-lens retroreflective article, with the transfer article shown coupled to a substrate.

In some embodiments, a retroreflective article 1 as disclosed herein may be supplied as part of a transfer article 100 achieved by providing retroreflective article 1 on a carrier layer 110. Specifically, a front side 2 of article 1 may be detachably disposed on a rear surface 111 of a carrier layer 110, as shown in exemplary embodiment in FIG. 5. Retroreflective article 1 (e.g. while part of a transfer article 100) may be coupled to any desired substrate 130, as shown in FIG. 5. In some embodiments this may be done by the use of a bonding layer 120 that is used to couple article 1 to a substrate 130, with the rear side 3 of article 1 facing the substrate 130. In some embodiments, such a bonding layer 120 can bond binder layer 10 (or any layer rearwardly disposed thereon) of article 1 to substrate 130. Such a bonding layer 120 may be e.g. a pressure-sensitive adhesive (of any suitable type and composition) or a heat-activated adhesive (e.g. an "iron-on" bonding layer). Various pressure-sensitive adhesives are described in detail in U.S. Patent Application Publication No. 2017/0276844, which is incorporated by reference herein in its entirety.

The term "substrate" is used broadly and encompasses any item, portion of an item, or collection of items, to which it desired to e.g. couple or mount a retroreflective article 1.

Furthermore, the concept of a retroreflective article that is coupled to or mounted on a substrate is not limited to a configuration in which the retroreflective article is e.g. attached to a major surface of the substrate. Rather, in some embodiments a retroreflective article may be e.g. a strip, filament, or any suitable high-aspect ratio article that is e.g. threaded into or through a substrate so that at least some portions of the retroreflective article are visible.

In some embodiments, substrate 130 may be a portion of garment. In some embodiments, substrate 130 may be a portion of a fabric of a garment. The term "garment" is used broadly, and generally encompasses any item or portion thereof that is intended to be worn, carried, or otherwise present on or near the body of a user. In such embodiments article 1 may be coupled directly to a garment e.g. by a bonding layer 120 (or by sewing or any other suitable method). In other embodiments substrate 130 may itself be a support layer to which article 1 is coupled e.g. by bonding or sewing and that adds mechanical integrity and stability to the article. The entire assembly, including the support layer, can then be coupled to any suitable item (e.g. a garment) as desired. Often, it may be convenient for carrier 110 to remain in place during coupling of article 1 to a desired entity and to then be removed after the coupling is complete. Strictly speaking, while carrier 110 remains in place on the front side of article 1, the areas 24 of transparent microspheres 21 will not yet be air-exposed and thus the retroreflective elements 20 may not yet exhibit the desired level of retroreflectivity. However, an article 1 that is detachably disposed on a carrier 110 that is to be removed for actual use of article 1 as a retroreflector, will still be considered to be an exposed-lens retroreflective article as characterized herein.

The present disclosure relies on layer-by-layer (LbL) self-assembly methods of disposing color layers on transparent microspheres. In general terms, the layer-by-layer (LbL) self-assembly method is a "bottom-up" coating technique that allows conformal coating of layers onto e.g. non-planar substrates (e.g. the surfaces of microspheres), with precise control of coating thickness e.g. on the nanoscale. The method allows VOC (volatile organic compound)-free coating from aqueous solutions under ambient conditions (non-vacuum), with a wide material set including both polymers and nanoparticles. The LbL process is commonly used to assemble thin films or coatings of oppositely charged polyelectrolytes electrostatically, but other functionalities such as hydrogen bond donor/acceptors, metal ions/ligands, and covalent bonding moieties can also be the driving force for film assembly. Typically, this deposition process involves exposing a substrate having a surface charge, to a series of liquid solutions. Since glass (e.g. ceramic) microspheres typically comprise a slight surface charge in the presence of water, it may not be necessary to perform any specific pretreatment of the microspheres to impart charges thereto, although this can be done if desired.

The deposition can be accomplished by immersion of the substrate into liquid baths (also referred to as dip coating), spraying, spin coating, roll coating, inkjet printing, and the like. Exposure to the first polyion liquid solution, in which the polyion has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. The substrate is then exposed to one or more water rinse steps to remove any physically entangled or loosely bound polyelectrolyte. Following the rinse, the substrate is then exposed to a second polyion liquid solution, in which the polyion has charge opposite that of the first polyion. Once again, adsorption occurs, since the surface charge of the substrate is opposite that of the polyion in the second liquid solution. Continued exposure to the second polyion liquid solution then results in a reversal of the surface charge of the substrate. A subsequent rinsing can be performed to complete the cycle. This sequence of steps is said to build up one layer pair, also referred to as a "bi-layer", and can be repeated as desired to add further layer pairs to the substrate. A polycation layer can comprise polycationic polymers or nanoparticles. Similarly, a polyanion layer can comprise polyanionic polymers or nanoparticles. Further details of LbL deposition methods are presented e.g. in U.S. Patent Application Publication No. 2017/0276844, which is incorporated by reference herein in its entirety. In some instances, the successively-deposited layers of bi-layers may bond together, may at least partially intermingle, and so on, so that the individual layers may not necessarily be separable from each other or even be distinguishable from each other. However, it will be appreciated that color layers deposited by LbL methods may be identifiable e.g. by the presence of the above-described binding groups (e.g. charged functional groups). In particular, such color layers may be distinguished from, for example, flexographically coated color layers, e.g. by the uniformity of the thickness and area distribution of the color layer, by the presence of binding groups (e.g. charged functional groups), and so on.

It will be appreciated that LbL color layers arranged as disclosed herein (e.g. at least in a location between an embedded portion of a transparent microsphere, and a binder layer) may advantageously provide retroreflective color that remains relatively uniform even at different retroreflectivity angles, as evidenced in the Examples herein.

In many embodiments, a retroreflective article can be made by starting with a carrier layer 110 as shown in exemplary embodiment in FIG. 5. Transparent microspheres 21 can be partially (and releasably) embedded into carrier layer 110 to form a layer of microspheres. For such purposes, in some embodiments carrier layer 110 may conveniently comprise e.g. a heat-softenable polymeric material that can be heated and the microspheres deposited thereonto in such manner that they partially embed therein. The carrier layer can then be cooled so as to releasably retain the microspheres in that condition for further processing. Typically, the microspheres as deposited are at least slightly laterally spaced apart from each other although occasional microspheres may be in lateral contact with each other.

In various embodiments the microspheres 21 may be partially embedded in carrier 110 e.g. to about 20 to 50 percent of the microspheres' diameter. The areas 25 of microspheres 21 that are not embedded in the carrier protrude outward from the carrier so that they can subsequently receive color layer 30, reflective layer 40, and binder layer 10 (and any other layers as desired). These areas 25 (which will form the embedded areas 25 of the microspheres in the final article) will be referred to herein as protruding areas of the microspheres during the time that the microspheres are disposed on the carrier layer.

Transparent microspheres may be used of any suitable type. The term "transparent" is generally used to refer to a body (e.g. a glass/ceramic microsphere) or substrate that transmits at least 75% of electromagnetic radiation at a selected wavelength or within a selected range of wavelengths in the visible light spectrum (e.g., from about 400 nm to about 700 nm); in some embodiments, at least about 80% of a selected wavelength (or range) in the visible spectrum, in some embodiments, at least about 85%; in some embodiments, at least about 90%; and in some embodiments, at least about 95%. In various embodiments, transparent microspheres may be made of e.g. inorganic glass, may have an average diameter of e.g. from 30 to 200 microns, and/or may have a refractive index of e.g. from 1.7 to 2.0. The vast majority (e.g. at least 90% by number) of the microspheres may be at least generally, substantially, or essentially spherical in shape. However, it will be understood that microspheres as produced in any real-life, large-scale process may comprise a small number of microspheres that exhibit slight deviations or irregularities in shape. Thus, the use of the term "microsphere" does not require that these items must be e.g. perfectly or exactly spherical in shape.

Further details of suitable carrier layers, methods of temporarily embedding transparent microspheres in carrier layer, and methods of using such layers to produce a retroreflective article, are disclosed in U.S. Patent Application Publication No. 2017/0276844.

After microspheres 21 are partially embedded in carrier 110, LbL deposition can be used to dispose color layers 30 on protruding areas 25 of selected microspheres. In various embodiments, a single color layer 30 can be applied to all of the microspheres; or, it can be applied only to microspheres that are in selected areas of carrier 110. In various embodiments, the LbL deposition may be carried out so as to form localized color layers or to form non-localized color layers. In some embodiments, a first color layer 30 may be applied in one or more areas (of the resulting article 1) and second, differing color layer 50 may be applied to one or more other areas. Masking methods may be used for such purposes.

In some embodiments, LbL layers as disclosed herein may wet onto, and adhere well to, the surface of transparent microspheres made e.g. of glass, but may not wet onto and/or adhere well to the surface 111 of a carrier 110 (e.g. in areas 112 between microspheres) made e.g. of polyolefinic material. Thus, the LbL process is particularly well suited for the production of localized color layers on e.g. glass microspheres. However, in alternative embodiments a surface 111 of a carrier 110 may be configured (e.g. by choice of the material of carrier 110, by disposing a primer or compatibilizing layer on surface 111, by treating the surface with a high energy treatment, or the like) so that an LbL layer is capable of wetting onto surface 111 and remaining there until transferred to the surface of binder 10. These methods may be used if a non-localized LbL color layer is desired.

Once the LbL process is finished (and after the deposition of any additional layer or layers, e.g. a reflective layer 40), a binder precursor can be applied to the microsphere-bearing carrier and solidified to form binder layer 10. Carrier 110 can then be removed to produce an article comprising color layers 30.

In some embodiments, LbL deposition methods can be used to dispose localized color layers 30 onto transparent microspheres before the microspheres are (partially) embedded in carrier 110. This allows the LbL process to be used to dispose localized color layers 30 on the entire radially outward surface of transparent microspheres. Such methods can provide retroreflective elements of the general type shown in FIG. 3, in which the entirety of the transparent microsphere is encapsulated by the localized color layer. Such methods may be performed e.g. by configuring transparent microspheres as a slurry in which the microspheres are exposed to successive aqueous coating mixtures that impart the various layers e.g. as detailed in the Examples herein. The resulting transparent microspheres, encapsulated by localized color layers, can then be partially embedded in a carrier 110 and can then be subjected to further processing (e.g. to provide reflective layers, a binder layer, and/or non-localized color layers) as desired. In some embodiments different batches of transparent microspheres can be provided with different color layers; the batches can then be mixed together and subjected to further processing, e.g. to produce a mixed-retroreflective-color article as shown in exemplary embodiment in FIG. 3.

The binder layer 10 may be of any suitable composition, e.g. it may be formed from a binder precursor that comprises an elastomeric polyurethane composition along with any desired additives, etc. Binder compositions, methods of making binders from precursors, etc., are described in U.S. Patent Application Publication Nos. 2017/0131444 and 2017/0276844, which are incorporated by reference herein in their entirety. As noted, in some embodiments a binder may comprise one or more colorants. In particular embodiments a binder may comprise one or more fluorescent pigments. Suitable pigments may be chosen e.g. from those listed in the above-cited '444 and '844 Publications. The binder precursor may be disposed, e.g. by coating, onto the microsphere-loaded carrier and then hardened to form the binder layer 110. The carrier 110 can then be removed at a desired time as discussed below, leaving behind the binder layer 10 with microspheres 21 partially embedded therein.

If desired, a substrate 130 (e.g., a fabric) can optionally be embedded in the binder precursor before the precursor is hardened to form the binder layer 10. (This can provide a substrate 130 that is directly bonded to the binder layer without requiring e.g. an adhesive layer, sewing, etc.). Alternatively, in some embodiments a bonding layer (e.g. an adhesive layer) 120 may be disposed on the rear side of binder layer 10, e.g. with a front surface 124 of the bonding layer in contact with a rear surface 15 of the binder layer. (Strictly speaking, even if a fabric layer is provided, an adhesive layer, e.g. an iron-on adhesive, may still be provided to facilitate coupling of the fabric layer/article 1 e.g. to a garment.)

The thus-formed construction, with carrier 110 still in place, is termed a transfer article (identified by reference number 100 in FIG. 5). The transfer article can then be coupled to a substrate (e.g. a rear surface 125 of a bonding layer 120 can be bonded to a front surface of a substrate) if no substrate was embedded in the binder layer in the manner described above. The substrate may be a fabric of a garment; or, it may be a sheet material (e.g. a patch) that will be further coupled to a garment in any desired manner. Typically, the carrier 110 will be removed (e.g. peeled off) at a desired time. In some embodiments the carrier may be removed after the transfer article has been coupled to a desired substrate, e.g. as a final step in the formation of the retroreflective article, in place on a desired garment.

As noted earlier, an article as disclosed herein may exhibit colors (whether imparted e.g. by a localized color layer, a non-localized color layer, or a colored binder layer) whose similarity or differences may be characterized using a CIE 1931 XYZ color space chromaticity diagram. That is, differences or similarities between colors may be characterized according to "x" and "y" chromaticity coordinates, and/or according to color luminance (Y), e.g. as discussed in U.S. Patent Application Publication Nos. 2017/0276844 and 2017/0293056. These Publications, which are incorporated by reference in their entirety herein, also discuss methods of characterizing retroreflectivity according to e.g. a coefficient of retroreflectivity ($R_A$). In various embodiments, at least selected areas of article 1 may exhibit a coefficient of retroreflectivity, measured at 0.2 degree observation angle and 5 degree entrance angle, in accordance with the procedures outlined in these Publications, of at least 50, 100, 150, 250, 350, or 450 candela per lux per square meter.

Various components of retroreflective articles (e.g. transparent microspheres, binder layers, reflective layers, etc.), methods of making such components and of incorporating such components into retroreflective articles in various arrangements, are described e.g. in U.S. Patent Application Publication Nos. 2017/0131444, 2017/0276844, and 2017/0293056, and in U.S. Provisional Patent Application No. 62/578,343, all of which are incorporated by reference in their entirety herein.

It will be appreciated that retroreflective elements comprising color layers as disclosed herein, can be used in any retroreflective article of any suitable design and for any suitable application. In particular, it is noted that the requirement of the presence of retroreflective elements comprising transparent microspheres (along with one or more LbL color layers, reflective layers, etc.) does not preclude the presence, somewhere in the article, of other retroreflective elements (e.g. so-called cube-corner retroreflectors) that do not comprise transparent microspheres.

LIST OF EXEMPLARY EMBODIMENTS

Embodiment 1 is an exposed-lens retroreflective article comprising: a binder layer; and, a plurality of retroreflective elements spaced over a length and breadth of a front side of the binder layer, each retroreflective element comprising a transparent microsphere partially embedded in the binder layer; wherein at least some of the retroreflective elements each comprise a color layer disposed on at least a portion of the transparent microsphere, wherein at least some of the color layers each comprise a bi-layer structure comprising a first layer comprising a first material and a second layer comprising a second material, wherein the first material comprises a first binding group and the second material comprises a second binding group, and wherein the first binding group and the second binding group have complementary interactions, and, wherein at least one of the first material or the second material comprises at least one colorant.

Embodiment 2 is the article of embodiment 1 wherein at least some of the color layers each comprise multiple bi-layer structures arranged in a stacked configuration, each bi-layer structure comprising a first layer comprising the first material and a second layer comprising the second material, wherein the first material comprises the first binding group and the second material comprises the second binding group.

Embodiment 3 is the retroreflective article of any of embodiments 1-2 wherein the at least one colorant is present in the second material and comprises a pigment or dye comprising a covalently-bonded second binding group selected from sulfonate, carboxylate, phosphonate, amine, ammonium, sulfonium, phosphonium, and combinations thereof.

Embodiment 4 is the article of any of embodiments 1-3 wherein the first material is a polyelectrolyte comprising first binding groups that are positively charged and wherein the second material comprises second binding groups that are negatively charged.

Embodiment 5 is the article of embodiment 4 wherein the second material comprises colorant particles comprising negatively charged surface groups that provide the second binding groups.

Embodiment 6 is the article of any of embodiments 1-5 wherein at least some of the color layers are localized color layers.

Embodiment 7 is the article of embodiment 6 wherein at least some of the localized color layers are each disposed between an embedded area of the transparent microsphere and the binder layer.

Embodiment 8 is the article of embodiment 6 wherein at least some of the localized color layers are each disposed around the entirety of a transparent microsphere, so that an embedded portion of the localized color layer is disposed between the embedded area of the transparent microsphere and the binder layer, and so that an exposed portion of the localized color layer is disposed on an exposed area of the transparent microsphere.

Embodiment 9 is the exposed-lens retroreflective article of any of embodiments 6-8 wherein the article comprises at least one first area comprising first localized color layers that exhibit a first color, and at least one second area comprising second localized color layers that exhibit a second color that is different from the first color.

Embodiment 10 is the exposed-lens retroreflective article of any of embodiments 1-9 wherein at least a portion of an exposed front surface of the article in areas laterally between the transparent microspheres, is provided by an exposed surface of a color layer that is a non-localized color layer.

Embodiment 11 is the exposed-lens retroreflective article of any of embodiments 1-10 wherein the binder layer comprises a colorant.

Embodiment 12 is the article of any of embodiments 1-11 wherein at least some of the retroreflective elements each comprise a reflective layer disposed rearwardly adjacent to an embedded portion of the color layer.

Embodiment 13 is the exposed-lens retroreflective article of embodiment 12 wherein at least some of the retroreflective elements each comprise a reflective layer that is a portion of a non-localized reflective layer.

Embodiment 14 is the exposed-lens retroreflective article of any of embodiments 12-13 wherein at least some of the retroreflective elements each comprise a reflective layer that is a localized reflective layer.

Embodiment 15 is the exposed-lens retroreflective article of any of embodiments 12-14 wherein the reflective layer is chosen from the group consisting of a vapor-deposited metallic layer, a dielectric-stack reflective layer, a printed reflective layer, a locally-laminated reflective layer, and combinations thereof.

Embodiment 16 is a article comprising the exposed-lens retroreflective article of any of embodiments 1-15 and a carrier layer on which the exposed-lens retroreflective article is detachably disposed with the front side of the binder layer facing the carrier layer.

Embodiment 17 is a substrate comprising the exposed lens retroreflective article of any of embodiments 1-16, wherein the binder layer of the retroreflective article is coupled to the substrate with at least some of the retroreflective elements facing away from the substrate.

Embodiment 18 is the substrate of embodiment 17 wherein the substrate is a fabric of a garment.

Embodiment 19 is the substrate of embodiment 17 wherein the substrate is a support layer that supports the exposed-lens retroreflective article and that is configured to be coupled to a fabric of a garment.

Embodiment 20 is a method of making a retroreflective article comprising a plurality of retroreflective elements at least some of which each comprise a color layer, the method comprising: disposing color layers on at least portions of at least some transparent microspheres, wherein at least some of the color layers each comprise a bi-layer structure comprising a first layer comprising a first material and a second layer comprising a second material, wherein the first material comprises a first binding group and the second material comprises a second binding group, and wherein the first binding group and the second binding group have complementary interactions; then, with the transparent microspheres borne by a carrier layer: disposing reflective layers on protruding areas of at least some of the color layers, disposing a binder precursor on the carrier layer and on the protruding areas of the transparent microspheres bearing the color layers and the reflective layers thereon, and, solidifying the binder precursor to form a binder layer.

Embodiment 21 is the method of embodiment 20 wherein the disposing of the color layers on at least portions of at least some transparent microspheres is performed with the transparent microspheres borne by the carrier layer.

Embodiment 22 is the method of embodiment 20 wherein the disposing of the color layers on at least portions of at least some transparent microspheres comprises disposing each color layer on an entirety of a transparent microsphere so that each color layers is a localized color layer that completely encapsulates a transparent microsphere, and wherein the method comprises the step of partially embedding the localized-color-layer-encapsulated transparent microspheres in the carrier layer so that the transparent microspheres are borne by the carrier layer.

Embodiment 23 is an article and/or substrate of any of embodiments 1-19 made by any of the methods of embodiments 20-22.

EXAMPLES

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Mo.

PDAC (poly(diallyl-dimethyl ammonium chloride)), a positively charged polymer with molecular weight 100-200K, was obtained as a 20 wt. % solution in water from Sigma-Aldrich Co. (St. Louis, Mo.). "CAB-O-JET™ 260M" (COJ260M), a magenta colorant available as a colloidal suspension with particle size of 105 nm and negatively charged (i.e., sulfonate) surface groups, was obtained at 11 wt. % pigment from Cabot Corporation (Boston, Mass.). PDAC was diluted to a concentration of 20 mM with respect to the repeat unit (i.e. 0.32 wt. %) with deionized (DI) water. CAB-O-JET™ 260M was diluted to a concentration of 0.10 wt. % with DI water; NaCl was added to the pigment suspension to a concentration of 0.05 M.

Example 1—Coating of LbL Color Layers on Carrier-Borne Transparent Microspheres

Deposition Apparatus and Process

Layer-by-layer self-assembled coatings were made using an apparatus purchased from Svaya Nanotechnologies, Inc. (Sunnyvale, Calif.) and modeled after the system described in U.S. Pat. No. 8,234,998 (Krogman et al.) as well as Krogman et al. *Automated Process for Improved Uniformity and Versatility of Layer-by-Layer Deposition, Langmuir* 2007, 23, 3137-3141. The apparatus comprises pressure vessels loaded with the coating solutions. Spray nozzles with a flat spray pattern (from Spraying Systems, Inc., Wheaton, Ill.) are mounted to spray the coating solutions and rinse water at specified times, controlled by solenoid valves. The pressure vessels (Alloy Products Corp., Waukesha, Wis.) containing the coating solutions were pressurized with nitrogen to 30 psi, while the pressure vessel containing DI water was pressurized with air to 30 psi. Flow rates from the coating solution nozzles were each about 10 gallons per hour, while flow rate from the DI water rinse nozzles was about 40 gallons per hour. The substrate to be coated was adhered around its edges with epoxy (Scotch-Weld epoxy adhesive, DP100 Clear, 3M Company, St. Paul, Minn.) to a glass plate that was mounted on a vertical translation stage and held in place with a vacuum chuck.

In a typical coating sequence, the polycation (e.g. PDAC) solution is sprayed onto the substrate while the stage moves vertically downward at 76 mm/sec. Next, after a dwell time of ~12 sec, the DI water solution is sprayed onto the substrate while the stage moves vertically upward at 102 mm/sec. Next, after a dwell time of ~4 sec, the polyanion (e.g. pigment nanoparticles) solution is sprayed onto the substrate while the stage moves vertically downward at 76 mm/sec. Another dwell period of 12 sec is allowed to elapse. Finally, the DI water solution is sprayed onto the substrate while the stage moves vertically upward at 102 mm/sec, and a dwell period of 4 sec is allowed to elapse. The above sequence is repeated to deposit a desired number of "bi-layers" denoted as (Polycation/Polyanion)$_n$ where n is the number of bi-layers. The substrate is then dried with an airknife at a speed of 3 mm/sec.

Sample Preparation

Carrier-borne transparent microspheres partially embedded into a carrier were obtained, in the form of an intermediate product of the general type used in production of the retroreflective product available from 3M Company, St. Paul, Minn., under the trade designation SCOTCHLITE 9920. The microspheres were high refractive index glass (with a refractive index estimated to be approximately 1.9) and the liner comprised a polyethylene layer with a paper backing. The carrier-borne microspheres were coated with bi-layers of PDAC/CAB-O-JET 260M using the above-described method. The coating process was repeated nine times to produce nine bi-layers, designated as (PDAC/COJ260M)$_9$. The inwardmost area of the carrier was then removed from the glass plate by cutting it away from the epoxy-bonded edges of the carrier.

The resulting article was then vapor-coated with a layer of reflective aluminum using customary vapor-coating apparatus and methods. The vapor-coated article was then coated with a binder layer precursor of composition shown in Table 1:

TABLE 1

| Ingredient | Percent by weight | Description | Supplier |
| --- | --- | --- | --- |
| Vitel 3580 | 93.4 | Copolyester solution | Bostik (Wauwatosa, WI) |
| Silane A-1310 | 1.8 | Gamma-isocyanatopropyltriethoxysilane | Momentive (Waterford, NY) |
| Desmodur L-75 | 4.6 | Aromatic polyisocyanate based on toluene diisocyanate | Covestro (Pittsburgh, PA) |
| DBTDL | 0.19 | Dibutyltin dilaurate | Aldrich (St. Louis, MO) |

The precursor was coated using a laboratory notch bar coater set at 8 mil gap. The resulting article was dried at 88° C. for 30 seconds, laminated under gentle pressure to a porous white polyester fabric, followed by drying at 102° C. for 6 minutes. After overnight curing under ambient conditions, the paper/polyethylene carrier was removed to produce an exposed-lens retroreflective article, labeled EX1.

Example 2—Coating of LbL Color Layers on Transparent Microspheres

In order to deposit LbL color layers on the entire surface of transparent microspheres, the following procedures were followed (rather than the spray-deposition process described above). A PDAC coating solution was made as in Example 1. Transparent glass microspheres were of the general type used in Example 1.50 g of the microspheres were slurried in 400 mL of the PDAC coating solution and swirled by hand for 1 min. The microspheres were allowed to settle, and the PDAC supernatant was poured off. The microspheres were then slurried in 400 mL of DI water and swirled by hand for 1 min. The microspheres were allowed to settle, and the supernatant was poured off. The DI water rinse sequence was repeated five times. Next, the microspheres were slurried in 400 mL of CAB-O-JET 260M coating solution (as made in Example 1) and swirled by hand for 1 min. The microspheres were allowed to settle, and the CAB-O-JET 260M supernatant was poured off. The microspheres were then slurried in 400 mL of DI water and swirled by hand for 1 min. The microspheres were allowed to settle, and the supernatant was poured off. The DI water rinse sequence was repeated five times.

The above procedures were repeated nine times in total, to produce transparent microspheres with nine bi-layers (PDAC/COJ260M)$_9$ present on the entire surface of the microspheres. The microspheres were then dried in an oven at 65° C. for 18 hours.

A polyethylene/paper carrier of the general type described in Example 1 was obtained (except that it did not comprise microspheres partially embedded therein). The carrier was heated in a box oven to approximately 110° C., and the above-described microspheres were pre-warmed to the same temperature. The microspheres were distributed (poured) by hand onto the exposed polyethylene surface of the carrier and were left for approximately 1 minute. The carrier was then removed from the oven and tilted to allow excess transparent microsphere beads to pour off the web. The carrier was subsequently heated to approximately 160° C. for 65 seconds to cause the transparent microspheres to partially sink into the polyethylene layer. The sink depth was less than the microsphere diameter so that a portion of the microspheres remained protruding above the surface of the polyethylene. The resulting article was brushed with a soft-bristled paint brush to remove any loosely attached microspheres.

The carrier bearing the LbL-coated microspheres was then vapor-coated with a layer of aluminum in the manner described above. The vapor-coated article was then coated with a binder precursor, laminated to a fabric, and dried, in similar manner as described above. After overnight curing under ambient conditions, the paper/polyethylene carrier was removed to produce an exposed-lens retroreflective article with localized color layers, labeled EX2.

Retroreflected brightness and color were measured with a RoadVista (San Diego, Calif.) Model 932 handheld sign retroreflectometer at specified observation and entrance angles. The retroreflected brightness is reported (in Table 2) as the coefficient of retroreflection, $R_A$, in units of Cd/lux/m$^2$. The retroreflected color is reported with unitless "x" and "y" values corresponding to the CIE1931 (x, y) color space. The brightness and color are listed as a function of the (observation angle in degrees/entrance angle in degrees). For instance, example EX1 exhibits x and y values of 0.590 and 0.374, at an observation angle of 0.2 degrees/entrance angle of 5 degrees.

TABLE 2

| Example | Ra (0.2°/5°) | Ra (0.2°/30°) | x/y (0.2°/5°) | x/y (0.2°/30°) |
| --- | --- | --- | --- | --- |
| EX1 | 173 | 95 | 0.590/0.374 | 0.600/0.370 |
| EX2 | 140 | 82 | 0.566/0.395 | 0.569/0.396 |

It is evident from Table 2 that the color of the Examples (as manifested in the x and y values) did not change significantly in 30 degree entrance-angle light in comparison to 5 degree entrance-angle light.

The Examples were compared to samples of commercially available retroreflective materials that exhibit color in retroreflectivity, which color is believed to result from the presence of a colorizing overlayer atop a layer of transparent microspheres. In qualitative visual inspection, Examples 1 and 2 were judged to retain their color well, even for light that was impinged on the retroreflective articles at high entrance angles. Specifically, Examples 1 and 2 exhibited a bright, magenta color for both head-on retroreflected light and for high-angle retroreflected light. In contrast, the conventional retroreflective material exhibited high-angle retroreflected light that was noticeably dimmer, and that shifted from a whitish-blueish color in head-on retroreflected light to a reddish color in high-angle retroreflected light.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein, this specification as written will control.

What is claimed is:

1. An exposed-lens retroreflective article comprising:
a binder layer; and,
a plurality of retroreflective elements spaced over a length and breadth of a front side of the binder layer, each retroreflective element comprising a transparent microsphere partially embedded in the binder layer;
wherein at least some of the retroreflective elements each comprise a color layer disposed on at least a portion of the transparent microsphere,
wherein at least some of the color layers each comprise a bi-layer structure comprising a first layer comprising a first material and a second layer comprising a second material, wherein the first material comprises a first binding group and the second material comprises a second binding group, and wherein the first binding group and the second binding group have complementary interactions,
wherein the first material is a polyelectrolyte comprising first binding groups that are positively charged and wherein the second material comprises second binding groups that are negatively charged;
and,
wherein at least one of the first material or the second material comprises at least one colorant.

2. The article of claim 1 wherein at least some of the color layers each comprise multiple bi-layer structures arranged in a stacked configuration, each bi-layer structure comprising a first layer comprising the first material and a second layer comprising the second material, wherein the first material comprises the first binding group and the second material comprises the second binding group.

3. The retroreflective article of claim 1 wherein the at least one colorant is present in the second material and comprises a pigment or dye comprising a covalently-bonded second binding group selected from sulfonate, carboxylate, phosphonate, amine, ammonium, sulfonium, phosphonium, and combinations thereof.

4. The article of claim 1 wherein the second material comprises colorant particles comprising negatively charged surface groups that provide the second binding groups.

5. The article of claim 1 wherein at least some of the color layers are localized color layers.

6. The article of claim 5 wherein at least some of the localized color layers are each disposed between an embedded area of the transparent microsphere and the binder layer.

7. The article of claim 5 wherein at least some of the localized color layers are each disposed around the entirety of a transparent microsphere, so that an embedded portion of the localized color layer is disposed between the embedded area of the transparent microsphere and the binder layer, and so that an exposed portion of the localized color layer is disposed on an exposed area of the transparent microsphere.

8. The exposed-lens retroreflective article of claim 5 wherein the article comprises at least one first area comprising first localized color layers that exhibit a first color, and at least one second area comprising second localized color layers that exhibit a second color that is different from the first color.

9. The exposed-lens retroreflective article of claim 1 wherein at least a portion of an exposed front surface of the article in areas laterally between the transparent microspheres, is provided by an exposed surface of a color layer that is a non-localized color layer.

10. The exposed-lens retroreflective article of claim 1 wherein the binder layer comprises a colorant.

11. The article of claim 1 wherein at least some of the retroreflective elements each comprise a reflective layer disposed rearwardly adjacent to an embedded portion of the color layer.

12. The exposed-lens retroreflective article of claim 11 wherein at least some of the retroreflective elements each comprise a reflective layer that is a portion of a non-localized reflective layer.

13. The exposed-lens retroreflective article of claim 11 wherein at least some of the retroreflective elements each comprise a reflective layer that is a localized reflective layer.

14. The exposed-lens retroreflective article of claim 11 wherein the reflective layer is chosen from the group consisting of a vapor-deposited metallic layer, a dielectric-stack reflective layer, a printed reflective layer, a locally-laminated reflective layer, and combinations thereof.

15. A substrate comprising the exposed lens retroreflective article of claim 1, wherein the binder layer of the retroreflective article is coupled to the substrate with at least some of the retroreflective elements facing away from the substrate.

16. The substrate of claim 15 wherein the substrate is a fabric of a garment.

17. The substrate of claim 15 wherein the substrate is a support layer that supports the exposed-lens retroreflective article and that is configured to be coupled to a fabric of a garment.

18. A transfer article comprising an exposed-lens retroreflective article comprising:
a binder layer; and,
a plurality of retroreflective elements spaced over a length and breadth of a front side of the binder layer, each retroreflective element comprising a transparent microsphere partially embedded in the binder layer;
wherein at least some of the retroreflective elements each comprise a color layer disposed on at least a portion of the transparent microsphere,
wherein at least some of the color layers each comprise a bi-layer structure comprising a first layer comprising a first material and a second layer comprising a second material, wherein the first material comprises a first binding group and the second material comprises a second binding group, and wherein the first binding group and the second binding group have complementary interactions, and, wherein at least one of the first material or the second material comprises at least one colorant;

and wherein the transfer article further comprises a carrier layer on which the exposed-lens retroreflective article is detachably disposed with the front side of the binder layer facing the carrier layer.

19. A method of making the retroreflective article of claim 1, the method comprising:

disposing color layers on at least portions of at least some transparent microspheres, wherein at least some of the color layers each comprise a bi-layer structure comprising a first layer comprising a first material and a second layer comprising a second material, wherein the first material comprises a first binding group and the second material comprises a second binding group, and wherein the first binding group and the second binding group have complementary interactions; and further wherein the first material is a polyelectrolyte comprising first binding groups that are positively charged and wherein the second material comprises second binding groups that are negatively charge;

then, with the transparent microspheres borne by a carrier layer:

disposing reflective layers on protruding areas of at least some of the color layers, disposing a binder precursor on the carrier layer and on the protruding areas of the transparent microspheres bearing the color layers and the reflective layers thereon, and, solidifying the binder precursor to form a binder layer.

20. The method of claim 19 wherein the disposing of the color layers on at least portions of at least some transparent microspheres is performed with the transparent microspheres borne by the carrier layer.

21. The method of claim 19 wherein the disposing of the color layers on at least portions of at least some transparent microspheres comprises disposing each color layer on an entirety of a transparent microsphere so that each color layer is a localized color layer that completely encapsulates a transparent microsphere, and wherein the method comprises the step of partially embedding the localized-color-layer-encapsulated transparent microspheres in the carrier layer so that the transparent microspheres are borne by the carrier layer.

* * * * *

UNITED STATES PATENT AND TRADEMARK OFFICE
CERTIFICATE OF CORRECTION

PATENT NO. : 11,280,942 B2
APPLICATION NO. : 15/733030
DATED : March 22, 2022
INVENTOR(S) : Daniel J Schmidt Page 1 of 1

It is certified that error appears in the above-identified patent and that said Letters Patent is hereby corrected as shown below:

In the Claims

Column 24
Line 2, In Claim 19, delete "charge" and insert -- charged --, therefor.

Signed and Sealed this
Eleventh Day of October, 2022

Katherine Kelly Vidal
*Director of the United States Patent and Trademark Office*